US010021971B2

(12) United States Patent
Ramirez

(10) Patent No.: US 10,021,971 B2
(45) Date of Patent: Jul. 17, 2018

(54) DISPLAY STAND

(71) Applicant: Max Ramirez, Corning, CA (US)

(72) Inventor: Max Ramirez, Corning, CA (US)

( * ) Notice: Subject to any disclaimer, the term of this patent is extended or adjusted under 35 U.S.C. 154(b) by 0 days.

(21) Appl. No.: 15/586,948

(22) Filed: May 4, 2017

(65) Prior Publication Data
US 2017/0318961 A1 Nov. 9, 2017

Related U.S. Application Data

(60) Provisional application No. 62/331,636, filed on May 4, 2016.

(51) Int. Cl.
| A47B 47/00 | (2006.01) |
| F16B 2/06 | (2006.01) |
| F16M 13/02 | (2006.01) |
| A47B 57/26 | (2006.01) |
| F16M 11/24 | (2006.01) |

(52) U.S. Cl.
CPC .......... *A47B 47/0008* (2013.01); *A47B 57/26* (2013.01); *F16B 2/065* (2013.01); *F16M 11/24* (2013.01); *F16M 13/022* (2013.01)

(58) Field of Classification Search
CPC ........ F16M 11/24; F16M 11/00; F16M 13/00; F16B 2/065; A47B 47/0008; A47B 57/26; A47B 47/00
USPC ....... 248/440, 173, 127, 158, 188.1, 188.91, 248/188, 558, 449, 132, 172; 52/645, 52/646, 651.1, 653.1, 653.2, 655.1; 182/182.1–182.5, 186.4–186.6
See application file for complete search history.

(56) References Cited

U.S. PATENT DOCUMENTS

| 467,081 | A | * | 1/1892 | Church | E06C 1/10 108/144.11 |
| 2,416,950 | A | * | 3/1947 | Pohrman | E04G 1/30 182/119 |
| 2,663,531 | A | * | 12/1953 | Rubano | A47B 97/04 248/217.4 |
| 3,738,606 | A | * | 6/1973 | Millen | A47B 97/08 108/15 |
| 4,008,786 | A | * | 2/1977 | Canavan | A47B 13/02 182/151 |
| 4,219,179 | A | * | 8/1980 | Silbernagel | G09F 7/18 248/159 |
| 4,248,326 | A | * | 2/1981 | Hansen | A47B 3/06 182/186.1 |
| 4,669,691 | A | * | 6/1987 | Solomon | F16M 11/10 248/165 |
| 5,224,753 | A | * | 7/1993 | Fox | A47B 3/14 108/101 |
| 5,240,217 | A | * | 8/1993 | Lizakowski | E01F 13/02 182/151 |
| 5,644,995 | A | * | 7/1997 | Gurwell | A47B 3/12 108/158.12 |
| 5,678,655 | A | * | 10/1997 | Bearden | E04G 1/32 182/151 |
| 5,857,577 | A | * | 1/1999 | Thomas | A47B 57/26 211/94.01 |

(Continued)

*Primary Examiner* — Nkeisha Smith
(74) *Attorney, Agent, or Firm* — Donn K. Harms

(57) ABSTRACT

A portable and self stabilizing stand which can display a wide array of objects and which can be expanded or contracted by the user to accommodate a large array of object types and sizes. The stand is easily assembled and disassembled without requiring specialized or generic tools or fasteners.

9 Claims, 2 Drawing Sheets

(56) References Cited

U.S. PATENT DOCUMENTS

| | | | | |
|---|---|---|---|---|
| 6,709,194 B1* | 3/2004 | Grimes | ................... | E04F 21/05 |
| | | | | 248/125.1 |
| 6,896,102 B1* | 5/2005 | Nichol | .................... | B25H 1/06 |
| | | | | 182/186.3 |
| 7,111,708 B2* | 9/2006 | Frey | ........................ | B25H 1/04 |
| | | | | 182/151 |
| 7,325,808 B1* | 2/2008 | Adler | ......................... | F41J 1/08 |
| | | | | 273/406 |
| 7,380,766 B2* | 6/2008 | Thompson | ............. | A47B 97/06 |
| | | | | 108/144.11 |
| 9,297,127 B2* | 3/2016 | Mettler | ................... | E01F 13/02 |
| 9,658,035 B2* | 5/2017 | Pixton | ........................ | F41J 1/10 |
| 2009/0107767 A1* | 4/2009 | Long | ........................ | B25H 1/06 |
| | | | | 182/186.1 |
| 2010/0006734 A1* | 1/2010 | Connell | ................... | B25H 1/06 |
| | | | | 248/440 |

* cited by examiner

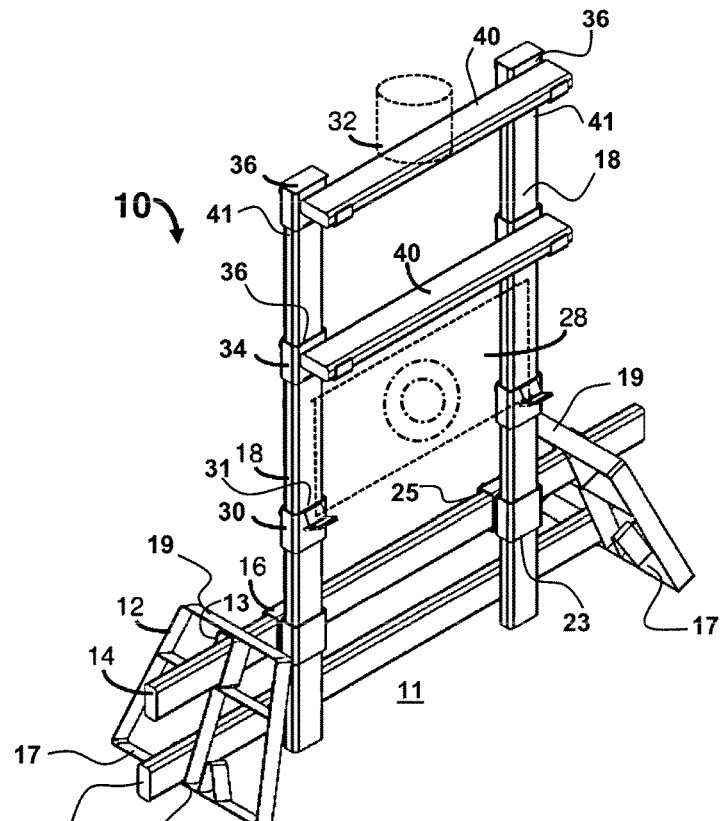
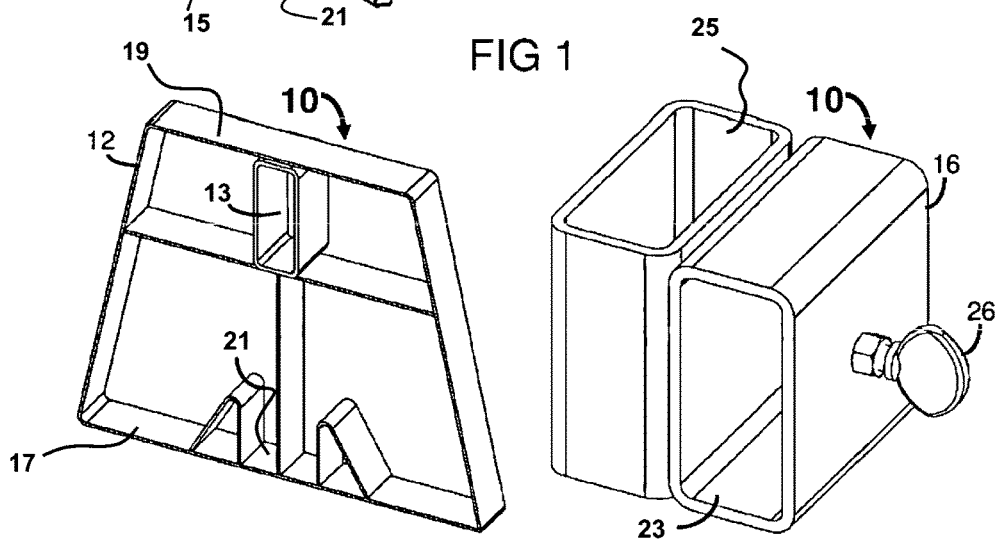
FIG 1
FIG 2
FIG 3

DISPLAY STAND

This application claims priority to U.S. Provisional Patent Application Ser. No. 62/331,636, filed on May 4, 2016, which is incorporated herein in its entirety by this reference thereto.

FIELD OF THE INVENTION

The present invention deals broadly with the field of portable display stands. More specifically, the disclosed device relates to a stable, portable platform for hanging or resting displayed items such as targets, which is easily assembled and disassembled without the aid of specialized or generic tools, and which is configured in an assembled mode to withstand lateral impact forces without falling.

BACKGROUND OF THE INVENTION

An array of currently available portable stands have been designed to accommodate a wide array of support purposes. Easels are used to display planar art, signs or notices. Sawhorses are additionally employed by many machine shops and construction sites to raise manufacturing and building components off the ground to ease fabrication. Shelving stands create a multi-leveled display which can accommodate one or an array of items. Finally, target holders are used to hang or display marksman targets during training and competition in areas which may be secluded to allow for stray shots to safely land without danger to surrounding residences or businesses.

Although many such stands employ embedded collapsible hinges or joints for increased portability, such hinged and jointed stands when configured for larger and heavier display items can be cumbersome and heavy to carry as a single unit. Further, such embedded joints and hinges are subject to failure over time especially after being moved multiple times. In the case of shooting stands, such hinges and mechanical pivots can become inoperable or destroyed by the impact of a high velocity projectile from a firearm.

Although conventional stands which may be disassembled allow for the display of objects of greater size and weight, many such devices require additional clamps or fasteners to maintain stability and rigidity and have on-board connections required for use. As such, these stands can become inoperable if the tools required to clamp or tighten the members of the device are missing or unavailable. Additionally, since many conventional stand devices are designed to accommodate only display items within a specific size range, they are not adaptable for alternative uses or modes.

The stand herein disclosed and described provides a collapsible and portable stand which can be assembled and disassembled without the need for specialized or generic hardware or tools. So assembled the device herein can accommodate a wide array of display items and sized objects. Further, the stand herein is formed of a durable materials which include the capability for expanded shelving, hanging and resting components.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

OBJECTS OF THE INVENTION

It is an object of the present invention to provide a stable, rigid, portable stable stand which can accommodate a large array of differently sized and configured display items.

It is an additional object of this invention to easily assemble and disassemble without the need of specialized or generic tools or fasteners.

It is a further object of the present invention to provide a durable stand which can expand or contract to display objects of varying size.

Yet another object of this stand is to provide a structure which, once assembled, is configured to employ the gravity imparted force of the assembled structure components, to form a stable stand which resists toppling when impacted by high velocity projectiles such as when used for target practice where ballistic projectiles impart significant force lateral to the stand.

A still further object of the invention herein is the provision of a stand assembled and collapsed from engaged components which employs no pivoting or connecting hardware which would become inoperable if struck by a bullet or projectile during use but which will remain sturdy and standing when so struck.

These and other objects, features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

SUMMARY OF THE INVENTION

In accordance with the purposes of the present invention, as embodied and broadly described herein, the present invention provides a collapsible and easily transportable display or target-supporting stand, formed of easily engaged components, which does not require any tools to assemble. Further, the device assembles from components which have no pivoting connectors or other mechanically engageable mating connector components, which limit collapsibility, and which can become inoperable when struck by a bullet or other projectile from a firearm during use.

The device is composed of a base requiring no tools nor screws or pins or hinges or the like to configure or assemble, which acts as a foundation for the projecting stand. This base is configured to move from an upright assembly position to a tilted engaged position where it will employ the force of the weight of the stand and base components from gravity, to form and maintain the stand highly resistant to toppling during use.

The assembled base of the stand employs at least two horizontal crossmembers which operatively engaged through adjustable crossbar brackets. The crossbar brackets engage the one or both crossmembers to each of two or more vertical beams projecting above the horizontal crossmembers. From the projecting vertically disposed beams, the user can choose to employ one or several pairs of adjustable angled brackets or adjustable shelf brackets, depending on their current intended use of the device. A top shelf bracket can be additionally implemented to place or hang display items from atop the device.

Structurally key to this novel assembly of a base which is highly resistant to toppling, is the configuration of the trapezoidal or triangularly shaped base, which is configured for operative engagement to an upper crossbar support as well as to two lower crossbar supports. In one preferred mode of the device, the height of an upper crossbar support is within a range of 1.1 to 1.75 times the height of the horizontal crossmembers above the underlying support surface.

In this favored configuration, a highly secure structure which is resistant to toppling under lateral force is formed without the use of hinges or removably engageable connectors using screws or the like which would become damaged during use. Instead, the highly stable structure is achieved using the weight of the portion of the stand supported by the base to cause the trapezoidal base to splay with both trapezoidal bases angling from the support surface or ground toward each other.

This configuration imparts the downward force from the weight of the above-positioned stand, and the weight of the two cross members, onto the crossmembers in opposing directions once assembled and during use. Such yields a highly stable foundation which is not easily toppled without using hinges, pivots, or engaged connector halves on the components which will become damaged. The stand additionally becomes more stable with the addition of more weight to one or both cross members communicated from the vertical supports which increase force stabilizing the stand from the increased force of gravity acting thereon.

Additionally, the width of the upper and lower crossbar support is formed slightly larger than the width of the horizontal crossmembers. This allows for easy device assembly but rigidity when assembled.

The adjustable crossbar bracket is composed of a first member or first tube and an adjacent perpendicular second member or second tube. Each has a length and width configured to accommodate a horizontal crossmember and a vertical beam respectively.

A clamping fastener attached to the outer faces of the first, and optionally, second tubes of the adjustable crossbar bracket can be preferably included. The clamping fasteners provide a compressive engagement to further secure the horizontal crossmember and a vertical beam respectively.

The adjustable angled bracket is mainly composed of a length of a hollow member such as a tube. An axial cavity running therethrough, is sized to slidably accommodate a vertical beam therethrough. It may also optionally utilize a clamping fastener to form a compressive engagement to a vertical beam when operatively engaged through the axial cavity.

Each adjustable angled bracket preferably additionally includes an angled shelf which can be used to mount planar display items or alternatively hang or exhibit additional displayed items. Each adjustable shelf bracket is also formed of a length of a hollow member or tube having an axial passage which is sized to accommodate a vertical beam running therethrough. Each shelf bracket may also include a clamping fastener to form a compressive engagement against the vertical beam running through the shelf bracket.

A shelf extending outwards from the front face of the adjustable shelf bracket should be sized to accommodate a shelf beam therebetween. Alternatively, the brackets are configured to allow for hanging displayed items therefrom such as targets or signs or the like.

A top or second shelf bracket is additionally formed from the length of a hollow member or tube which includes an axial passage sized to accommodate the positioning of a vertical beam therein. The second or top shelf bracket is preferably capped at one end to seal the axial passage and thereby contact and cover the distal end of a vertical beam.

A clamping fastener on the outer face of the top shelf bracket can preferably be employed to form a compressive engagement in a securement to the portion of the vertical beam within the axial passage. This top shelf bracket can also contain an upper shelf beam that accommodates a shelf beam or optionally allows the user to hang additional displayed items.

Employing the device herein, the user will position each of a pair of base members to an assembly position substantially upright and then insert one horizontal crossmember into the first passage, and then insert a horizontal crossmember into one or both lower crossbar ledges formed in the base, which formed by the two trapezoidal shaped base components. No tools are required for this assembly.

With the horizontal first crossbar engaged, and the second crossbar engaged with both trapezoidal bases, they are then tilted inwards, towards the center of the device to the engaged position, such that the outer lower and inner upper edges of the upper supports, within the trapezoidal base member, contact a horizontal crossmember. Preferably, a maximum separation distance between the bases should be formed to provide greater stability.

After securing a first axial passage of one or both adjustable crossbar brackets to one or both of the horizontal crossmembers, the user then inserts one of the two vertical beams into the second axial passage running through each slidably adjustable crossbar bracket and optionally secures the clamping fasteners if present.

The sets of adjustable crossbar brackets and vertical support beams can be installed as far or as close together as required by the user.

The user can choose to install, and optionally employ a clamping fastener to affix one or a pair of first shelf brackets and one or several pairs of adjustable angled brackets, adjustable shelf brackets or second shelf beams depending on their current intended use of the device.

Finally, the user can employ one or more of the angled brackets as well as one or more shelf beams to mount planar display items or alternatively hang or exhibit additional displayed items.

The two trapezoid shaped base components and the angled and other shelf brackets should be preferably formed from a rigid and durable material from a group of such materials, including one or a combination of aluminum, carbon steel, stainless steel, plastic, carbon fiber or resin. When employed, the clamping fastener used for forming compressive removable engagements, can be one or a combination of any currently available durable securement means including but not limited to a group of fasteners such as thumb screws, wing nuts, clasps, clamps, bands or bolts.

A currently preferred length of the horizontal crossmembers, vertical beams and shelf beams should be between 30 and 90 inches and sized as shown and described herein. Such has shown to form a stable device, but disassemble to fit in a trunk or rear of a vehicle easily. Additionally, the cross section of the horizontal crossmembers, vertical beams, and shelf beams is preferably rectangular with a width of substantially 2 inches and a height of substantially 4 inches respectively. By substantially is meant plus or minus 50 percent of the stated width or length. However, the crossmembers and vertical beams may be of substantially equal height and width, or may, alternatively, exhibit a circular or geometric cross area with smaller or larger dimensions to display larger items, if the base and other components are configured for to engage such cross sectional configurations.

The crossmembers, vertical beams, and shelf beams can be composed of any durable material including but not limited to: wood, fiberglass, plastic, epoxy or metal.

With respect to the above description, before explaining at least one preferred embodiment of the herein disclosed invention in detail, it is to be understood that the invention is not limited in its application to the details of construction and to the arrangement of the components in the following description or illustrated in the drawings. The device herein described and disclosed in the various modes and combinations is also capable of other embodiments and of being practiced and carried out in various ways which will be obvious to those skilled in the art. Any such alternative configuration as would occur to those skilled in the art is considered within the scope of this patent. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other portable, collapsible stands for carrying out the several purposes of the present disclosed device. It is important, therefore, that the claims be regarded as including such equivalent construction and methodology insofar as they do not depart from the spirit and scope of the present invention.

BRIEF DESCRIPTION OF DRAWING FIGURES

The accompanying drawings, which are incorporated herein and form a part of the specification illustrate some, but not the only nor exclusive examples of, embodiments and/or features of the disclosed device. It is intended that the embodiments and figures disclosed herein are to be considered illustrative of the invention herein, rather than limiting in any fashion.

In the drawings:

FIG. 1 depicts an isometric view of the assembled device herein formed from preferred components and showing the structural stability provided by the pair of trapezoidal base components in the assembly in engaged positions tilted toward each other and a central area of a horizontal crossmember.

FIG. 2 displays an isometric view of each base member component of the device in an assembly position ready for engagement of crossmembers prior to movement to the assembled position of FIG. 1.

FIG. 3 shows an isometric view of the adjustable crossbar bracket of the device.

DETAILED DESCRIPTION OF THE INVENTION

Figure 4:
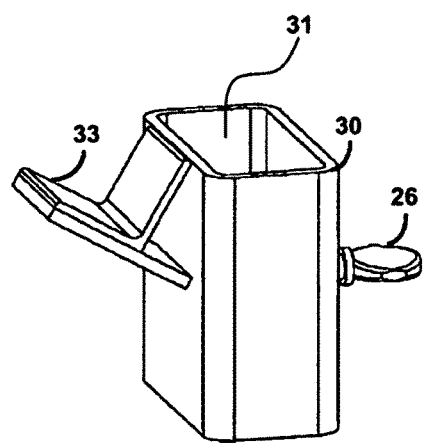
FIG. 4 depicts an isometric view of the adjustable angled bracket of the device.

Now referring to drawings in FIGS. 1-6, wherein similar components are identified by like reference numerals, there is seen in FIG. 1, the device 10, displayed in an assembled configuration. As shown the device 10 includes all of the preferred components required for operation of the device 10 in any of its preferred modes such as supporting targets used for target practice with firearms or bows and arrows. The device 10 is especially resistant to toppling from side impacts from high velocity projectiles, without the use of hinges or cooperative connectors engaged with screws or pins and the like, which could become easily damaged by such projectiles.

The device 10, as shown in FIG. 1, includes first and second base members 12 which form a stable foundation for the assembled device 10 when situated on a support surface such as soil or a floor. Each base member 12 includes a first ledge or passage 13 sized to slidably engage with and constrain a first horizontal cross member 14 at a position adjacent the opposing ends thereof. This first passage 13 has in a sorter dimension thereof, a width just slightly larger than a width of the first horizontal crossmember 14. This allows for a sliding engagement of the first horizontal crossmember 14 into the first passage 13, but prevents twisting while engaged in the first passage 13. By slightly larger is meant between 2-20 percent larger than the width of the first horizontal cross member 14.

A distance of the height of the first passage 13, exceeds a distance of the height of the first crossmember 14. To that end, the distance of the height of the first passage 13 should be between 1.1 to 1.75 times the height of the first horizontal crossmembers 14, to allow the first and second base members 12 to tilt toward each other and angle toward a center section of the first cross member 14 in-between the engaged first and second base members 12 when operatively engaged.

The angling toward the center section during use forces one edge of a perimeter edge or an edge of the first passage 13 or a similarly situated edge, of each of the pair of base members 12, to form a compressive contact at respective contact points upon the exterior surface of the first crossmember 14. The force of these compressive contacts by each of the pair of base members 12 increases as the weight supported by the engaged first crossmember 14 increases.

Adjustable crossbar brackets 16 connect one or both crossmembers 14 to two vertical beams 18. Each crossbar bracket 16 has a first axial passage having a perimeter edge sized just slightly larger than the first horizontal cross member 14 such that it will slidably engage around the perimeter edge of the first horizontal cross member 14. Each crossbar bracket also has a second axial passage having an axis running substantially perpendicular to the axis of the first axial passage. This second axial passage has an interior circumference sized to slidably engage upon the surface of the exterior circumference of a vertical beam 18. The unique trapezoidal shape of each of the base members 12 positions a first side 17 upon the soil or support surface during use for increased stability. A narrower second side 19 of each base member 12 focuses the force of contact upon the top surface of the first horizontal support member 14. While a rectangular and square version of the base member 12 was tried during experimentation on the device 10, the trapezoid shape herein was found unexpectedly to yield a significantly sturdier formed structure of the device 10 such as in FIG. 1.

The user can choose to employ one or several pairs of adjustable angled brackets 30 or adjustable shelf brackets 34 depending on their current intended use of the device 10. A top shelf bracket 36 can be additionally implemented to place or hang display items 32 from atop the device 10.

Shown in FIG. 2, the trapezoidal or triangularly shaped base members 12 include the first passage 13 providing the noted support for the first crossbar 14. Also included are at least one and preferably two ledges 21 which provide for slidable engagement with and support of a second member or second horizontal crossmember 15. As noted, the height of the upper crossbar support 12a should be substantially 1.1 to 1.75 times the height of the first horizontal crossmembers 14. This allows both of the base members 12 to tilt toward each other and a central portion of the first crossmember 14 during use, such that the weight of the device 10 causes the base members 12 to splay at an angle relative to the support surface which is sufficient to create a stable foundation. As noted, the force from the load generated by gravity on the weight, which imparted by the angled base members 12 on the upper surface of the first crossmember 14, fixes their engagement to their respective contact positions with the crossmembers 12. Further, the force of this weight is communicated to the first side 17 of the base members 12 fixing their respective positions on the support surface they contact.

Additionally, the width of the lower positioned ledges 21 which are proximate to the first side 17, is slightly larger than the width of the second horizontal crossmembers 15 such as 1.1 times the width of the second horizontal crossmember 15. This close contact allows for a sliding engagement of one end of the second crossmember 15 through the formed ledge 21, but prevents twisting under load which helps stabilize the formed device 10.

The formed ledges 21 have an open side forming them more like a slot. This is intentional in that it prevents any contact with the top surface of the second horizontal cross member 15 during use. This allows all of the force of the load to communicate from the edge of the second side 19 of the base member 12, or the formed passage 13 adjacent thereto, to the upper surface of the engaged first horizontal member 14, which, during experimenting, was found to yield enhanced stability.

The adjustable crossbar bracket 16, shown in FIG. 3, includes the first axial passage 23 and an adjacent and perpendicular second axial passage 25. The dimensions length and width of the first axial passage 23 are configured for a sliding and close contact engagement with the exterior circumference of the first horizontal member 14. The circumference of the first axial passage 23 should mirror that of the first horizontal crossmember 14, but should be between 1-10% larger to insure a sliding fit that does not rotate or twist excessively under load.

The circumference of the second axial passage 25 should mirror in shape the circumference of the vertically disposed first support beam 18 and second support beam 27. The circumference of the second axial passage 25 should also be between 1-10% larger than the circumference of the first support beam 18 and second support beam 27 to provide an easy sliding engagement therethrough, which is stable and avoids twisting and movement under load.

As shown, preferably a clamping fastener 26 is operatively engaged through the wall defining the first axial passage 23, and can be optionally engaged through the wall surface defining the second axial passage 25. In operation, this clamping fastener 26 such as the shown thumbscrew, can be employed to compressibly engage against the exterior surface of either the first support beam 18 or the second support beam 27 during use, to elevate the proximal ends 29 of the support beams 18 and 27, slightly above the support surface 11. Such will cause the weight and thus, the force from the load to increase upon the contact points of the base members 12 when tilting and forming such contacts on the surface of the first horizontal crossmember 14. A clamping fastener 26 can also be operatively engaged through the wall forming the first axial passage 23, and employed in a compressive engagement with the first horizontal crossmember 14

Depicted in FIG. 4 the adjustable angled bracket 30 has an axial passageway sized in circumference to mirror the circumference of the first support beam 18 and second support beam 27 to allow a sliding engagement thereon. A clamping fastener 26 engaged through the wall forming the axial passage 31 can be included to allow for a compressive engagement.

The angled bracket 30 may include a support shelf 33 which preferably angles upward to a distal end from the first end extending from the sidewall adjacent the support beam 18 when engaged thereto. The support shelf 33 on brackets 30 operatively connect to either of the first support beam 18 and second support beam 27, and engaged thereto, are employable to support or as a mount for planar display items 28 such as a target, or alternatively to hang or exhibit additional displayed items 32.

Figure 5:
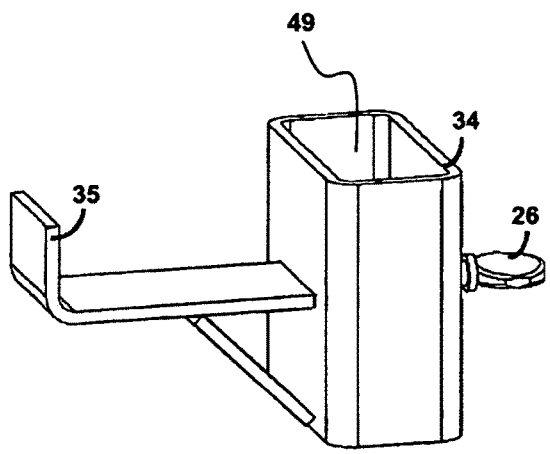
FIG. 5 shows an isometric view of the adjustable shelf bracket of the device.

An adjustable shelf bracket 34, as seen in FIG. 5 and shown operatively engaged in FIG. 1, is also formed of a sidewall defining axial opening 49 running therethrough. The axial opening 36 has a circumference mirroring that of the first vertical beam 18 and second vertical beam 27, but is as with the other components, slightly larger in size to allow a sliding engagement that does not twist under load. A clamping fastener 26 may also be provided for a compressive engagement upon either the first support beam 18 or second support beam 27.

The support member 35 extending outwards from the sidewall defining the axial opening 36 of the adjustable shelf bracket 34 should be sized to accommodate and hold elevated a shelf beam 30. Optionally a user may hang or support additional displayed items 32.

Figure 6:
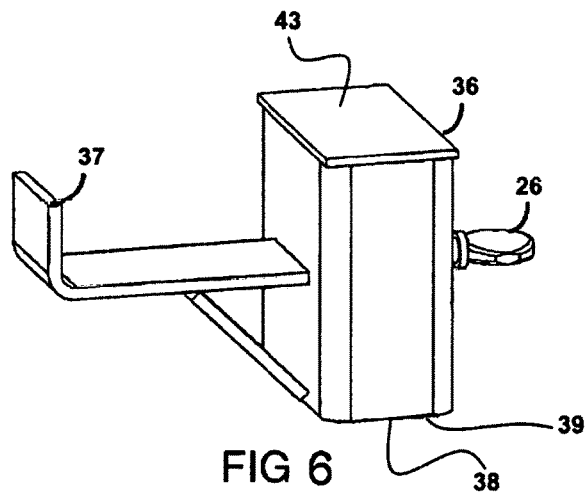
FIG. 6 depicts an isometric view of the top shelf bracket of the device.

Shown in FIG. 6, a top or second shelf bracket 36 also formed of a sidewall defining conduit 38 communicating through the sidewall from an open end 39. The conduit 38 has an interior circumference which mirrors and is slightly larger than the exterior circumference of the first support beam 18 and second support beam 27 at distal ends 41 of each. By slightly larger is meant for this conduit and other axial passages and passageways, is meant from 1-10% larger in circumferential size than the respective support beam it surrounds. A cap 43 is engaged at a second end opposite the open end 39. This cap 43 contacts the distal end 41 of the vertical beam on which the second shelf bracket 36 is engaged. A clamping fastener 26 communicates through the sidewall of the second shelf bracket 36 and can preferably be employed for securement to the vertical support beams 18 or 27.

The second shelf bracket 36 has a secondary support 37 which is employable to support a shelf beam 40 or optionally allow the user to hang additional displayed items 32.

Employing the device 10, herein, the user would insert the first horizontal crossmember 14 into the respective first passage 13, and then insert the second horizontal crossmembers 15 into one or both ledges 21 supporting the second horizontal cross member 15 to the base member 12.

The base member 12 is then tilted on the supported wider end 17 inwards, toward a central area of the first cross member 14 between both respective support members 12, such that at least the second edge 19 of the base member 12, and preferably a lower edge of the wall defining the passage 13, contact the horizontal crossmember 14. Preferably, a maximum separation distance between the two bases 12 employed should be formed to provide greater stability.

After securing a respective first axial passage 23 of an adjustable crossbar bracket 16 to one or both of the horizontal crossmembers 14, the user then inserts the first support beam 18 into the second axial passage 25 of each adjustable crossbar bracket 16 and optionally secures the clamping fasteners 26 if present. The sets of adjustable crossbar brackets 16 and vertically disposed support beams 18 can be installed as far or as close together as required by the user.

The user can choose to install, and optionally employ a clamping fastener 26 to affix one, or a pair of angled brackets 30 and one or several pairs of adjustable angled brackets 30, adjustable shelf brackets 34, or shelf beams 40 depending on their current intended use of the device 10.

Finally, the user can employ one or more of the angled or shelf brackets 30 as well as one or more shelf beams 40 to mount planar display items 28 or alternatively hang or exhibit additional displayed items 32.

The base 12 and the brackets 30, 34, 36, should be preferably formed from a rigid and durable material including but not limited to: aluminum, carbon steel, stainless steel, plastic, carbon fiber or resin.

The clamping fastener 26 can be one or a combination of any currently available, durable securement means including but not limited to: thumb screws, wing nuts, clasps, clamps, bands or bolts.

The preferred length of the horizontal crossmembers 14, vertical beams 18, and shelf beams 40 should be between 30 and 90 inches, 30 and 90 inches, and 10 to 50 inches respectively. Additionally, the cross section of the horizontal crossmembers 14, vertical beams 18, and shelf beams 30 is preferably rectangular with a width and height of substantially 2 inches and 4 inches respectively, but may alternatively exhibit a circular or geometric cross area with smaller or larger dimensions to display larger items.

The crossmembers 14, vertical beams 18, and shelf beams 40 can be composed of any durable material including but not limited to: wood, fiberglass, plastic, epoxy or metal.

As noted, any of the different configurations and components can be employed with any other configuration or component shown and described herein. Additionally, while the present invention has been described herein with reference to particular embodiments thereof and steps in the method of production, a latitude of modifications, various changes and substitutions are intended in the foregoing disclosures, it will be appreciated that in some instance some features, or configurations, or steps in formation of the invention could be employed without a corresponding use of other features without departing from the scope of the invention as set forth in the following claims. All such changes, alternations and modifications as would occur to those skilled in the art are considered to be within the scope of this invention as broadly defined in the following appended claims.

Further, the purpose of any abstract of this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What it claimed is:

1. A self stabilizing support stand comprising:
   a pair of base members, each of said pair of base members having a first end opposite a second end and having two opposing sides extending therebetween;
   said first end of each of said pair of base members adapted for positioning on a support surface;
   each of said base members having passage adjacent a respective said second end thereof;
   a first crossmember having a first side engaged with a said passage upon a first of said pair of base members;
   said first crossmember having a second side engaged with a said passage upon a second of said pair of base members;
   a first support beam in a removable engagement to said first cross member, said first support beam in a vertical disposition relative to a horizontal disposition of said first crossmember;
   a second support beam in a removable engagement to said first cross member, said second support beam in a vertical disposition relative to said horizontal disposition of said first crossmember;
   said pair of base members moveable from an assembly position to an assembled position wherein both of said base members are tilted toward each other and both have a respective said second end thereof in a contact against an upper surface of said first cross member, whereby said first support beam and said second support beam are maintained in said vertical position for supporting a planar display therebetween;
   said removable engagement of said first support beam to said first cross member comprises a first cross bar bracket;
   said first cross bar bracket having a first axial passage forming a circumferential engagement around said first support beam;
   said first cross bar bracket having a second axial passage running in a direction normal to said first axial passage;
   said second axial passage being in a circumferential engagement around said first crossmember;
   said removable engagement of said second support beam to said first cross member comprises a second cross bar bracket;
   said second cross bar bracket having a first axial passage forming a circumferential engagement around said first support beam;
   said second cross bar bracket having a second axial passage running in a direction normal to said first axial passage on said second crossbar bracket; and
   said second axial passage of said second cross bar bracket being in a circumferential engagement around said first crossmember.

2. The self stabilizing support stand of claim 1, additionally comprising:
   a first clamping fastener positioned on a sidewall surrounding said first axial passage of said first cross bar bracket;
   said clamping fastener actuable to form a compressive contact with said first support beam within said first axial passage of said first cross bar bracket;
   a second clamping fastener positioned on a sidewall surrounding said first axial passage of said second cross bar bracket; and
   said second clamping fastener actuable to form a compressive contact with said first support beam within said first axial passage of said second cross bar bracket.

3. The self stabilizing support stand of claim 2, additionally comprising:
   a first angle bracket having an axial passageway engaged upon said first support beam;
   a first shelf engaged at a first end to an exterior surface of a sidewall defining said axial passageway of said first angle bracket;

said first shelf extending at an inclining angle from said first of said first shelf to a distal end of said first shelf;
a second angle bracket having an axial passageway engaged upon said second support beam;
a second shelf engaged at a first end to an exterior surface of a sidewall defining said axial passageway of said second angle bracket;
said second shelf extending at an inclining angle from said first of said second shelf to a distal end of said second shelf; and
respective inclining surfaces of said first shelf and said second shelf defining a support for a lower edge of a planar display positioned thereon.

4. A self stabilizing support stand comprising:
a pair of base members, each of said pair of base members having a first end opposite a second end and having two opposing sides extending therebetween;
said first end of each of said pair of base members adapted for positioning on a support surface;
each of said base members having passage adjacent a respective said second end thereof;
a first crossmember having a first side engaged with a said passage upon a first of said pair of base members;
said first crossmember having a second side engaged with a said passage upon a second of said pair of base members;
a first support beam in a removable engagement to said first cross member, said first support beam in a vertical disposition relative to a horizontal disposition of said first crossmember;
a second support beam in a removable engagement to said first cross member, said second support beam in a vertical disposition relative to said horizontal disposition of said first crossmember;
each of said pair of base members having a ledge adjacent a respective said first end thereof; and
a second cross member supported at or adjacent a first end thereof upon said ledge of said first of said pair of base members;
said second cross member supported at or adjacent a second end thereof upon said ledge of said second of said pair of base members;
said pair of base members moveable from an assembly position to an assembled position wherein both of said base members are tilted toward each other and both have a respective said second end thereof in a contact against an upper surface of said first cross member, whereby said first support beam and said second support beam are maintained in said vertical position for supporting a planar display therebetween;
said removable engagement of said first support beam to said first cross member comprises a first cross bar bracket;
said first cross bar bracket having a first axial passage forming a circumferential engagement around said first support beam;
said first cross bar bracket having a second axial passage running in a direction normal to said first axial passage;
said second axial passage being in a circumferential engagement around said first crossmember;
said removable engagement of said second support beam to said first cross member comprises a second cross bar bracket;
said second cross bar bracket having a first axial passage forming a circumferential engagement around said first support beam;
said second cross bar bracket having a second axial passage running in a direction normal to said first axial passage on said second crossbar bracket; and
said second axial passage of said second cross bar bracket being in a circumferential engagement around said first crossmember.

5. The self stabilizing support stand of claim 4, additionally comprising:
a first clamping fastener positioned on a sidewall surrounding said first axial passage of said first cross bar bracket;
said clamping fastener actuable to form a compressive contact with said first support beam within said first axial passage of said first cross bar bracket;
a second clamping fastener positioned on a sidewall surrounding said first axial passage of said second cross bar bracket; and
said second clamping fastener actuable to form a compressive contact with said first support beam within said first axial passage of said second cross bar bracket.

6. The self stabilizing support stand of claim 5, additionally comprising:
a first angle bracket having an axial passageway engaged upon said first support beam;
a first shelf engaged at a first end to an exterior surface of a sidewall defining said axial passageway of said first angle bracket;
said first shelf extending at an inclining angle from said first of said first shelf to a distal end of said first shelf;
a second angle bracket having an axial passageway engaged upon said second support beam;
a second shelf engaged at a first end to an exterior surface of a sidewall defining said axial passageway of said second angle bracket;
said second shelf extending at an inclining angle from said first of said second shelf to a distal end of said second shelf; and
respective inclining surfaces of said first shelf and said second shelf defining a support for a lower edge of a planar display positioned thereon.

7. A self stabilizing support stand comprising:
a pair of base members, each of said pair of base members having a first end opposite a second end and having two opposing sides extending therebetween;
said first end of each of said pair of base members adapted for positioning on a support surface;
each of said base members having passage adjacent a respective said second end thereof;
a first crossmember having a first side engaged with a said passage upon a first of said pair of base members;
said first crossmember having a second side engaged with a said passage upon a second of said pair of base members;
a first support beam in a removable engagement to said first cross member, said first support beam in a vertical disposition relative to a horizontal disposition of said first crossmember;
a second support beam in a removable engagement to said first cross member, said second support beam in a vertical disposition relative to said horizontal disposition of said first crossmember;
said first end of each of said pair of base members having a length which is longer than a length of said second end of each of said pair of base members;
each of maid pair of base members being trapezoidal in shape;

said pair of base members moveable from an assembly position to an assembled position wherein both of said base members are tilted toward each other and both have a respective said second end thereof in a contact against an upper surface of said first cross member, whereby said first support beam and said second support beam are maintained in said vertical position for supporting a planar display therebetween;

said removable engagement of said first support beam to said first cross member comprises a first cross bar bracket;

said first cross bar bracket having a first axial passage forming a circumferential engagement around said first support beam;

said first cross bar bracket having a second axial passage running in a direction normal to said first axial passage;

said second axial passage being in a circumferential engagement around said first crossmember;

said removable engagement of said second support beam to said first cross member comprises a second cross bar bracket;

said second cross bar bracket having a first axial passage forming a circumferential engagement around said first support beam;

said second cross bar bracket having a second axial passage running in a direction normal to said first axial passage on said second crossbar bracket; and said second axial passage of said second cross bar bracket being in a circumferential engagement around said first crossmember.

8. The self stabilizing support stand of claim 7, additionally comprising:

a first clamping fastener positioned on a sidewall surrounding said first axial passage of said first cross bar bracket;

said clamping fastener actuable to form a compressive contact with said first support beam within said first axial passage of said first cross bar bracket;

a second clamping fastener positioned on a sidewall surrounding said first axial passage of said second cross bar bracket; and said second clamping fastener actuable to form a compressive contact with said first support beam within said first axial passage of said second cross bar bracket.

9. The self stabilizing support stand of claim 8, additionally comprising:

a first angle bracket having an axial passageway engaged upon said first support beam;

a first shelf engaged at a first end to an exterior surface of a sidewall defining said axial passageway of said first angle bracket;

said first shelf extending at an inclining angle from said first of said first shelf to a distal end of said first shelf;

a second angle bracket having an axial passageway engaged upon said second support beam;

a second shelf engaged at a first end to an exterior surface of a sidewall defining said axial passageway of said second angle bracket;

said second shelf extending at an inclining angle from said first of said second shelf to a distal end of said second shelf; and respective inclining surfaces of said first shelf and said second shelf defining a support for a lower edge of a planar display positioned thereon.

\* \* \* \* \*